(12) United States Patent
Anam et al.

(10) Patent No.: US 11,772,162 B2
(45) Date of Patent: Oct. 3, 2023

(54) LOCAL COLLECTION OF CONTAMINANTS FORMED DURING METAL POWDER BED FUSION PROCESS

(71) Applicant: GM Global Technology Operations LLC, Detroit, MI (US)

(72) Inventors: Md Ashabul Anam, Sterling Heights, MI (US); Mark A Smith, Huntington Woods, MI (US); Tyson W Brown, Royal Oak, MI (US); Richard J Skurkis, Lake Orion, MI (US); HyungMin Chae, Troy, MI (US); Whitney A Poling, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 400 days.

(21) Appl. No.: 17/083,758

(22) Filed: Oct. 29, 2020

(65) Prior Publication Data

US 2022/0134425 A1 May 5, 2022

(51) Int. Cl.
*B22F 10/00* (2021.01)
*B22F 3/10* (2006.01)
(Continued)

(52) U.S. Cl.
CPC ............ *B22F 10/00* (2021.01); *B22F 3/1007* (2013.01); *B29C 64/35* (2017.08); *B22F 2201/20* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| 6,169,605 B1 * | 1/2001 | Penn ..................... B29C 64/112 358/1.1 |
| 2004/0084814 A1 * | 5/2004 | Boyd ..................... B29C 64/35 264/109 |

(Continued)

OTHER PUBLICATIONS

Dyson, Universal Mini Turbine Head, << www.dyson.com/support/journey/spare-details.9155034-02>>(accessed Oct. 1, 2020).

(Continued)

*Primary Examiner* — Kevin E Yoon
*Assistant Examiner* — Ryan L Heckman
(74) *Attorney, Agent, or Firm* — Vivacqua Crane, PLLC

(57) ABSTRACT

A powder bed fusion system includes a powder bed including a build surface and a vacuum system. The vacuum system includes a collection device positioned over the build surface. The collection device includes a body, a pathway defined in the body, wherein the pathway ends in a passageway opening, and a particle retainer connected to the body near the passageway opening. A method of forming a component includes forming a layer of unfused metal powder on a powder bed with a recoater, introducing gas to the powder bed and applying a vacuum with a collection device, fusing a portion of the layer of unfused metal powder on the powder bed with a heat source to form a component layer and generating contaminants, collecting the contaminants from the powder bed with the gas and the vacuum applied by the collection device.

14 Claims, 7 Drawing Sheets

(51) Int. Cl.
 *B29C 64/35* (2017.01)
 *B33Y 30/00* (2015.01)
 *B33Y 10/00* (2015.01)

(56) References Cited

U.S. PATENT DOCUMENTS

| | | | | |
|---|---|---|---|---|
| 2007/0075461 | A1* | 4/2007 | Hunter | B29C 64/245 425/174 |
| 2009/0194425 | A1* | 8/2009 | Cohen | C25D 5/022 205/123 |
| 2014/0052288 | A1* | 2/2014 | El-Siblani | B29C 64/264 700/119 |
| 2015/0367448 | A1* | 12/2015 | Buller | H05B 6/68 219/74 |
| 2016/0368207 | A1* | 12/2016 | Hyde | B33Y 40/00 |
| 2017/0165909 | A1* | 6/2017 | Hakkaku | B29C 64/188 |
| 2018/0085856 | A1* | 3/2018 | Bour | B33Y 80/00 |
| 2018/0272604 | A1* | 9/2018 | Welch | B05C 11/06 |
| 2018/0370213 | A1* | 12/2018 | Gold | B33Y 40/20 |
| 2019/0381567 | A1* | 12/2019 | Chir | B33Y 40/00 |
| 2020/0163507 | A1* | 5/2020 | Percy-Raine | B01D 45/06 |

OTHER PUBLICATIONS

Beau Jackson, "GE Investigate the Speed of Metal 3D Printers Through Higher Power Lasers", 3D Printing Industry.com, <<https://3dprintingindustry.com/news/ge-investigate-speed-metal-3d-printers-higher-power-lasers-120118/>>(accessed Oct. 27, 2020).

* cited by examiner

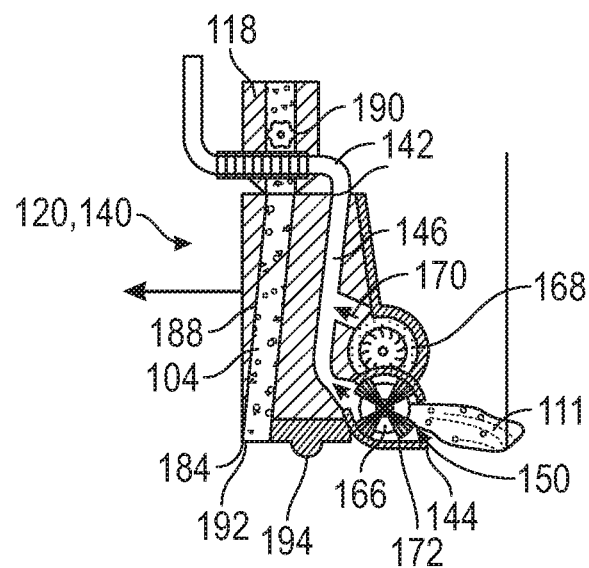
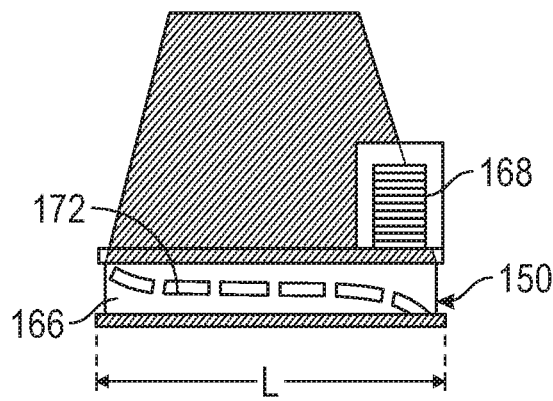
FIG.5A  FIG. 5B
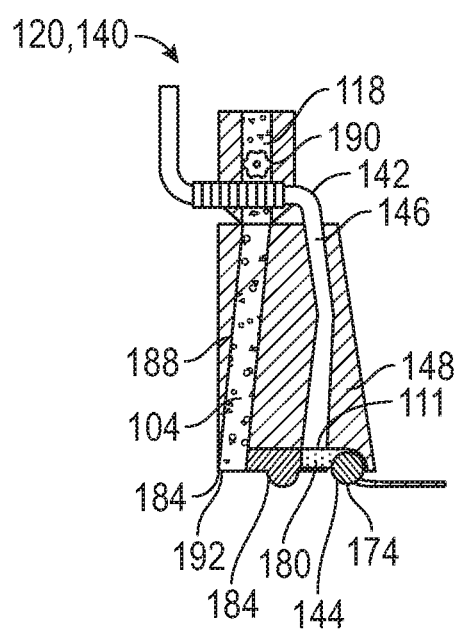
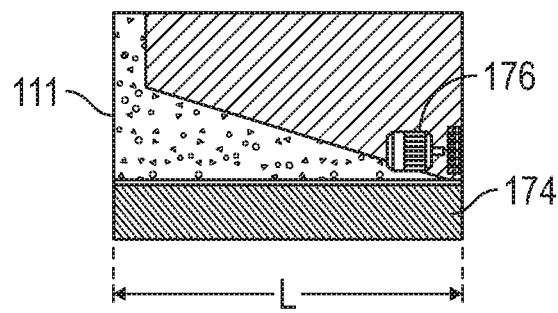
FIG. 6A  FIG. 6B

LOCAL COLLECTION OF CONTAMINANTS FORMED DURING METAL POWDER BED FUSION PROCESS

INTRODUCTION

Powder bed fusion is a process of forming three-dimensional objects by scanning a heat source, such as a laser or electron beam, onto a layer of unfused metal or polymeric powdered material deposited in a build tray. The heat source consolidates a portion of the powder to form a layer of the three-dimensional object. The build tray is then lowered relative to the focal point of the heat source to accommodate the next layer of unfused powder, which is then deposited over the fused and unfused powder present in the powder bed. The three-dimensional object is then formed layer by layer. The unfused powder remaining in the powder bed helps to support the three-dimensional object as is it being formed.

Contaminants from entrained powder, vaporized metal, and spatter are sometimes formed when using laser as a heat source to melt metal powder. These contaminants may cause porosity and other degradation in the three-dimensional part, reduce the reusability of unfused powder, block a portion of the laser lens, and increase the cleaning time required for cleaning surfaces in the build chamber. Spatter may result from a number of sources including ejection of unfused powder by gaseous vapor jets generated from localized laser heating, the ejection of liquid droplets from the melt pool by metallic vapor jets generated from localized laser heating, powder agglomeration including solid-liquid agglomeration and liquid-liquid agglomeration where partially melted or liquid powder agglomerate near the melt pool but do not become a part of the melt pool as well as from spatter ejection of liquid melt from part defects due to, for example, trapped gases being released in voids. The chemical composition of the spatter may be altered due to oxidation of the spatter.

Contaminants are often removed from the build area using an inert gas flow that travels above the powder bed. Some of the spatter and contaminants become entrained in the gas flow and are carried out of the build area. However, heavier contaminants may fall back into the powder bed. These contaminants may comingle with the unfused powder or fall on fused powder layers, which may later lead to voids and porosity or other defects.

Thus, while the presently used collection processes achieve their intended purpose, there is a need for a new and improved system and process for locally collecting contaminants formed during the metal powder bed fusion process.

SUMMARY

According to several aspects, a powder bed fusion system includes a powder bed including a build surface and a vacuum system. The vacuum system includes a collection device positioned over the build surface. The collection device includes a body, a pathway defined in the body, wherein the pathway ends in a passageway opening, and a particle retainer connected to the body near the passageway opening.

In further aspects, the particle retainer includes a magnetic roller.

In yet further aspects, the magnetic roller is driven by a motor.

In further aspects, the particle retainer includes a brush.

In yet further aspects, the brush is driven by a turbine.

In further aspects, the vacuum system includes a retractable tube connected to the body.

In additional aspects, a centrifugal pump is connected to the body in the passageway opening.

In additional aspects, a recoater device including a feed pathway is defined by the body.

In further aspects, the body further includes a bottom and the powder bed fusion system further includes a leveling device located at or near the bottom of the body.

According to several aspects, a powder bed fusion system includes a powder bed including a build surface, a feed tank, a recoater connectable to the feed tank movable over the powder bed, a heat source located over the powder bed, a vacuum system and a gas supply system connected to the powder bed. The vacuum system includes a collection device positioned over the build surface. The collection device includes a body, a pathway defined in the body, wherein the pathway ends in a passageway opening, and a particle retainer connected to the body near the passageway opening.

In further aspects, the recoater and the collection device are integrated.

In further aspects, the collection device is movable relative to the powder bed.

In further aspects, the powder bed is movable relative to the collection device.

In further aspects, the powder bed includes a vacuum port and the collection device is movable to align the particle retainer with the vacuum port.

According to several aspects, a method of forming a component includes forming a layer of unfused metal powder on a powder bed with a recoater. The method further includes introducing gas to the powder bed and applying a vacuum with a collection device. The method yet further includes fusing a portion of the layer of unfused metal powder on the powder bed with a heat source to form a component layer and generating contaminants. The method also includes collecting the contaminants from the powder bed with the gas and the vacuum applied by the collection device, wherein the collection device is maintained at a distance less than a maximum distance from the heat source.

In further aspects, the recoater and the collection device are integrated.

In additional aspects, the method further includes feeding unfused metal powder from a feed tank into the recoater.

In additional aspects, the method further includes first fusing a border of the component layer and then fusing an infill of the component layer.

In further aspects, the method further includes dividing the infill of the component layer into segments of a given width, fusing a first of the segments of the infill and then fusing an adjoining segment of the infill.

In further aspects, the method yet further includes angling the collection device.

BRIEF DESCRIPTION OF THE DRAWINGS

The drawings described herein are for illustration purposes only and are not intended to limit the scope of the present disclosure in any way.

FIG. 5A illustrates a collection device according to an exemplary embodiment;

FIG. 5B is a front view of the collection device of FIG. 5A according to an exemplary embodiment;

FIG. 6A illustrates a collection device according to an exemplary embodiment;

FIG. 6B is a front view of the collection device of FIG. 6A according to an exemplary embodiment;

DETAILED DESCRIPTION

The following description is merely exemplary in nature and is not intended to limit the present disclosure, application, or uses.

The present disclosure is directed to the local collection of contaminants formed during the metal powder bed fusion process, including a system, device, and method for collecting contaminants. In aspects, the device includes a vacuum pathway defining a collection opening. In further aspects, the device includes a powder feedstock pathway.

Figure 1:
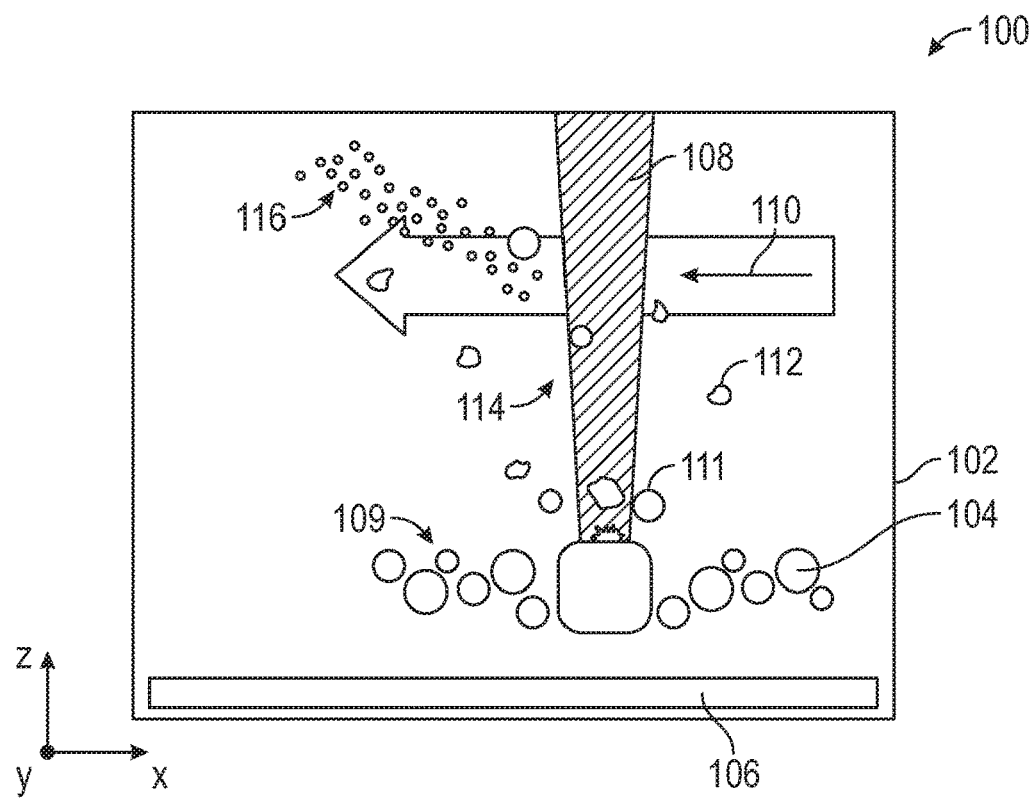
FIG. 1 is a schematic illustration of a metal powder bed fusion system according to an exemplary embodiment.

Reference is now made to FIG. 1, which illustrates an aspect of a metal powder bed fusion system 100. The metal powder bed fusion system 100 includes a powder bed 102, in which the metal powder 104 is contained during the metal fusion process. The metal powder 104 is deposited in layers on a build surface 106. As the metal powder 104 is heated and melted by the heat source 108 located over the powder bed 102, metal powder 104 contaminants 111 form. Gas 110 flows over the surface 109 of the metal powder 104 in the powder bed 102 to remove the contaminants 111. As described above, the contaminants 111 include, for example, spatter 112, entrained metal powder 114, and condensate 116.

Figure 2:
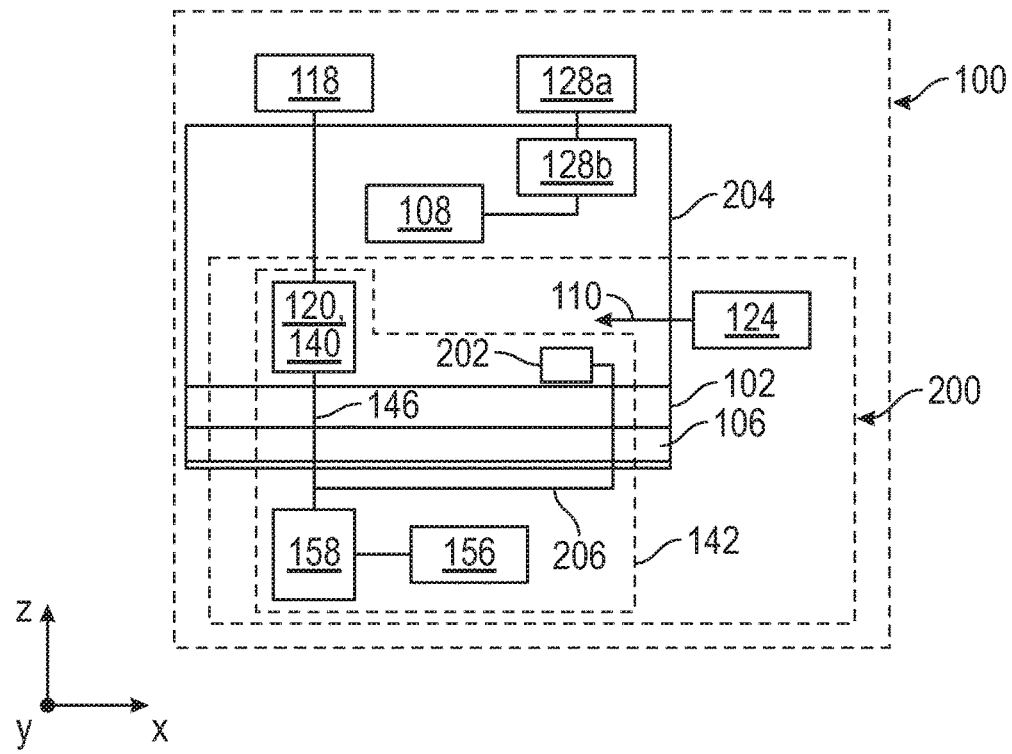
FIG. 2 is a schematic illustration of a collection system according to an exemplary embodiment.

The metal powder 104 is stored in a feed tank 118, illustrated in FIG. 2, and fed into the powder bed 102 through a recoater 120 on the powder bed 102, which moves over the powder bed 102 to dispense and level unfused metal powder in the powder bed 102. In alternative aspects, the powder bed 102 moves relative to the recoater 120. The feed tank 118 is connected to the recoater 120. In further aspects and as discussed further herein, the connection between the feed tank 118 and the recoater 120 may be couplable and un-couplable allowing movement of the recoater 120 independent of the feed tank 118. The metal powder 104 includes, but is not limited to one or more metals and metal alloys, such as titanium, aluminum, iron, copper, tungsten, nickel, gold, silver, platinum, titanium aluminide, cobalt-chrome alloys, ferrous alloys including at least 40 percent by weight iron and nickel alloys including at least 30 percent by weight nickel. The particle size for the powders, in aspects, is in the range of 1 to 150 microns, including all values and ranges therein such as in the range of 15 microns to 60 microns, 45 microns to 105 microns, etc. In further aspects, the metal powder is delivered to the powder bed 102 in a binder and, in yet further aspects, a heat source 108 is omitted.

The gas 110 is supplied to the powder bed 102 by a gas supply system 124, which is connected to the powder bed 102. The gas supply system 124 includes one or more of the following, for example, gas tanks, valves, flow control regulators, and diverters. In aspects, the gas 110 is an inert gas, such as argon or nitrogen.

The heat source 108 includes, for example, a laser, an electron beam, a radiative heat source such as infrared radiation, or a convective heat source such as hot air. In aspects, the heat source 108 may move in the x-y axis (see FIG. 2). Alternatively, the heat source 108 may be stationary and directed across the surface 109 of the powder bed 102 in the x-y axis through one or more lenses, including optical or magnetic focusing lenses. The heat source 108 scans the surface 109 of the metal powder 104 in the powder bed 102 to fuse the metal powder 104 in the scanning path of the heat source 108.

Figure 3:
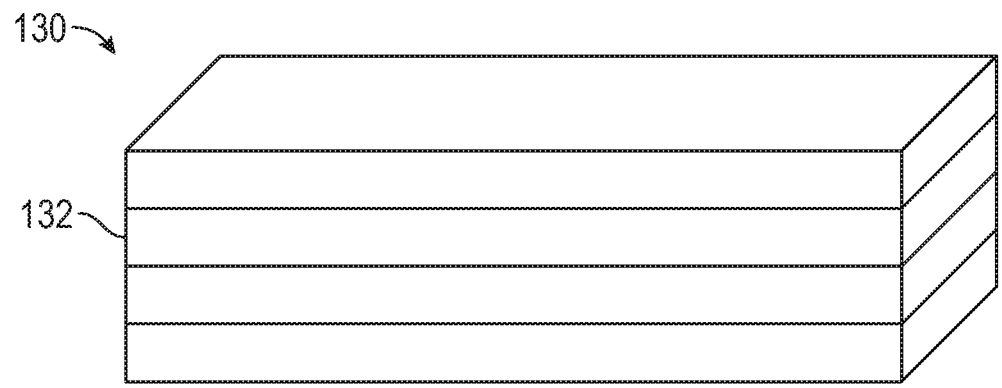
FIG. 3 illustrates a three-dimensional component divided into layers from which the component is formed.

In aspects, as illustrated in FIG. 2, a one or more processors 128 are provided. The processors 128a, 128b (referred generally herein as processors 128) parse computer aided drawing (CAD) files, breaking up a digital rendition of the component 130 into a number of layers 132, an aspect of which is illustrated in FIG. 3, and creating a set of executable commands for each layer 132. In addition, the processors 128 execute the executable code to print the component 130. In aspects, the processors 128 are integrated into the metal powder bed fusion system 100. In alternative aspects, one or more processors 128a are independent of the metal powder bed fusion system 100 and the executable commands are provided to other processors 128b integrated into the metal powder bed fusion system 100.

Figure 4:
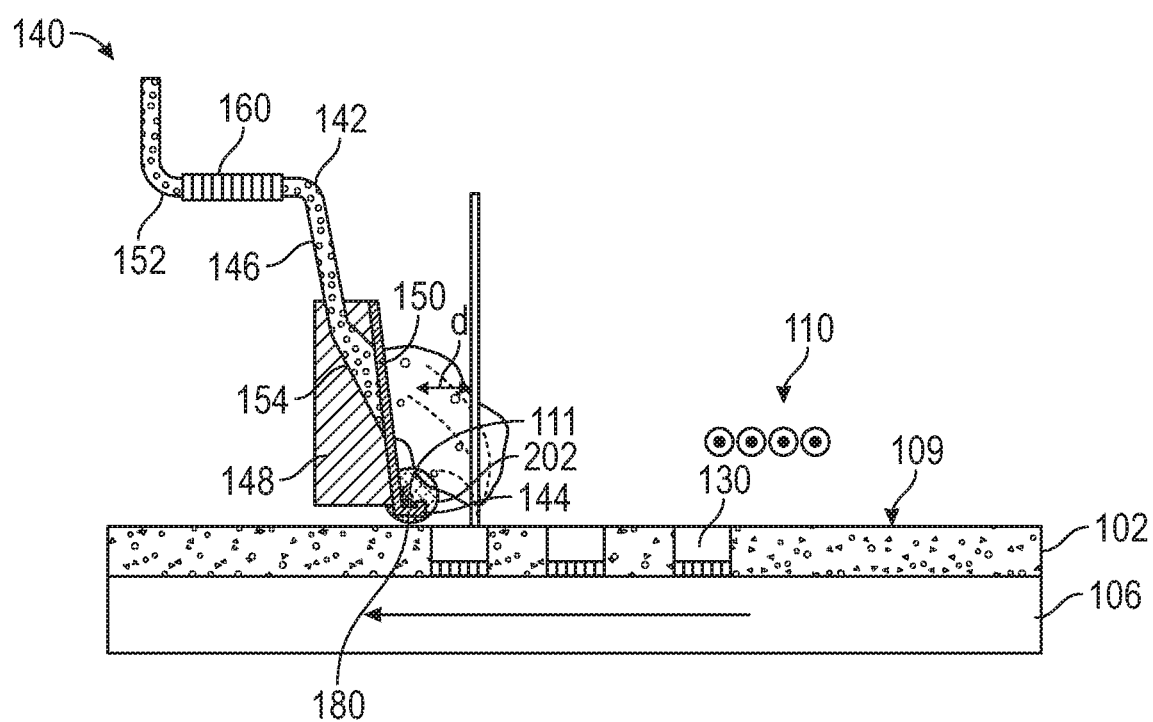
FIG. 4 illustrates a collection system according to an exemplary embodiment.

Reference is now made to FIG. 4 in addition to FIG. 2, which illustrate an aspect of a collection device 140 for the contaminants 111 positioned over the build surface 106 of the powder bed 102. The collection device 140 includes, in aspects, a vacuum system 142 and a particle retainer 144. The vacuum system 142 includes a vacuum pathway 146, which is defined by one or more tubes 152 or passages 154 formed in the body 148 of the collection device 140, and a vacuum source 156 (illustrated in FIG. 2), such as a vacuum pump, and a trap 158 (also illustrated in FIG. 2) to collect the contaminants 111. In the illustrated aspect, the vacuum pathway 146 ends at a passageway opening 150 defined in the collection device 140 in which the contaminants 111 are received into the vacuum system 142. In the illustrated aspect, the collection device 140 includes a retractable tube 160 that defines a portion of the vacuum pathway 146 and is connected to the body 148. The retractable tube 160 allows for movement of the collection device 140 across the surface 109 of the powder bed 102.

The particle retainer 144 is connected to the body 148 of the collection device 140 near the passageway opening 150. The particle retainer 144 retains contaminants 111 that are too large to be collected via the vacuum system 142 or fall out of the flow of gas 110 sweeping across the surface 109 of the powder bed 102. In the illustrated aspect of FIG. 4, the particle retainer 144 includes a particle trap 180 into which the contaminants 111 that are not carried away by the vacuum system 142 fall.

In another aspect, illustrated in FIGS. 5A and 5B, the particle retainer 144 includes a brush 166, which is positioned in the passageway opening 150 of the vacuum pathway 146. The brush 166 sweeps the contaminants 111 into the vacuum pathway 146. The brush 166 is rotated by a vacuum driven turbine 168, which is coupled to the vacuum source 156 through a branch 170 in the vacuum pathway 146. In aspects, the vacuum driven turbine 168 and brush 166 are mechanically coupled through enmeshed gears or a drive belt. In the illustrated aspect, the brush 166 includes bristles 172 arranged around the brush. In aspects, the bristles 172 are natural bristles, which may reduce or prevent static charge buildup. In alternative aspects, the bristles 172 may be formed of a polymer material, such as nylon, or other synthetic material. The contaminants 111 are captured by the brush 166 and drawn into the vacuum pathway 146 of the vacuum system 142.

In yet another aspect, illustrated in FIGS. 6A and 6B, the particle retainer 144 is a magnetic roller 174 for capturing ferromagnetic contaminants. The distance of the magnetic roller 174 from the powder bed 102 may be used to adjust the size of the particles picked up by the magnetic roller 174. By placing the magnetic roller 174 a sufficient distance from the powder bed 102, the magnetic roller 174 may pick up mostly, if not all, contaminants 111. The magnetic roller 174 is driven by a motor 176. It should be appreciated that the motor 176 of FIGS. 6A and 6B may be substituted for the vacuum driven turbine 168 of FIGS. 5A and 5B and the vacuum driven turbine 168 of FIGS. 5A and 5B may be substituted for the motor 176 of FIGS. 6A and 6B. FIG. 6A also illustrates a particle trap 180 positioned behind the particle retainer 144. The particle trap 180 collects contaminants 111 within the body 148 of the collection device 140 that are too heavy to be entrained in the vacuum.

FIGS. 5A, 5B, 6A and 6B further illustrate the collection device 140 integrated into the recoater 120. The recoater-collection device 120, 140 includes a feed pathway 188 defined in the body 148 for feeding unfused metal powder 104 into the powder bed 102. In the aspect illustrated, the feed pathway 188 of the recoater-collection device 120, 140 is positioned under and, in aspects, connectable to the unfused metal powder 104 feed tank 118, where metal powder 104 is dispensed from the feed tank 118 and into the feed pathway 188. The feed tank 118 includes a valve 190, which shuts off the flow of the metal powder 104 when the feed pathway 188 is full. In further aspects (not illustrated), a secondary feed tank is integrated into the recoater-collection device 120, 140. The feed pathway 188 terminates at an opening 192 defined in the bottom 184, or near the bottom 184, of the recoater-collection device 120, 140. FIGS. 5A and 6A also illustrate a leveling device 194. In aspects, the leveling device 194 includes a protrusion, such as a stationary ball shaped protrusion or a rotating roller, located at the bottom 184 of the collection device 140 that runs the length L (see FIG. 5B) of the collection device 140. In alternative aspects, the leveling device 194 may be an angled protrusion or a protrusion that assumes another geometry.

In aspects, illustrated in FIGS. 2 and 4, the collection device 140 is part of a collection system 200 including the gas supply system 124, the vacuum system 142, and vacuum ports 202 defined in the walls 204 of the powder bed 102. The vacuum ports 202 are coupled to the vacuum source 156 through a port pathway 206 that is defined by, for example, tubes or pipes. The collection device 120 lines up with the vacuum port 202 so that contaminants 111 that are present in the particle trap 180 may be removed by the collection system 200.

Figure 7:
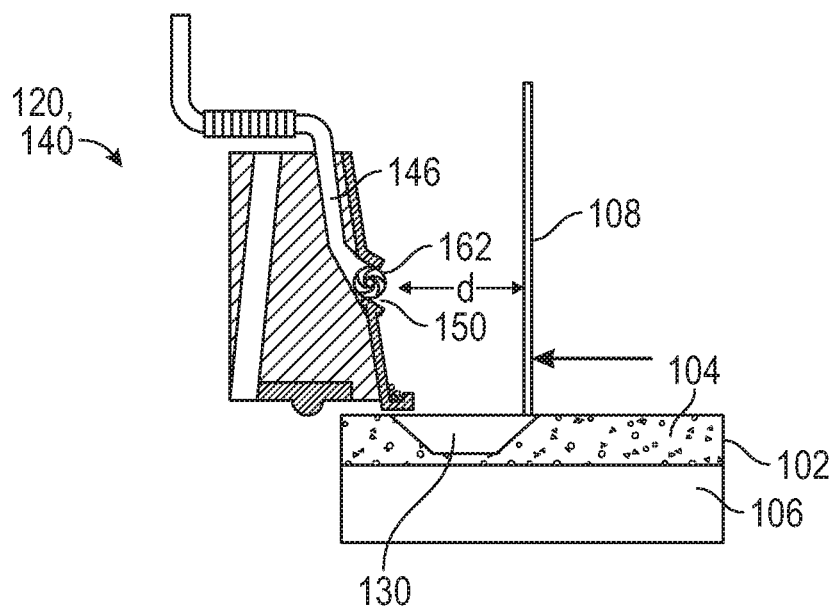
FIG. 7 illustrates positioning of a collection system relative to a component and the heat source according to an exemplary embodiment.

FIG. 7 illustrates another aspect of a combined recoater-collection device 120, 140. In the illustrated aspect, a centrifugal pump 162 is connected to the body 148 of the recoater-collection device 102, 140 in the passageway opening 150 of the vacuum pathway 146 defined in the recoater-collection device 120, 140. The centrifugal pump 162 may be driven by a motor or the vacuum pressure in the vacuum pathway 146. In aspects, the speed of the centrifugal pump 162 is varied to accommodate variations in distance d between the recoater-collection device 120, 140 and the heat source 108.

Figure 8:
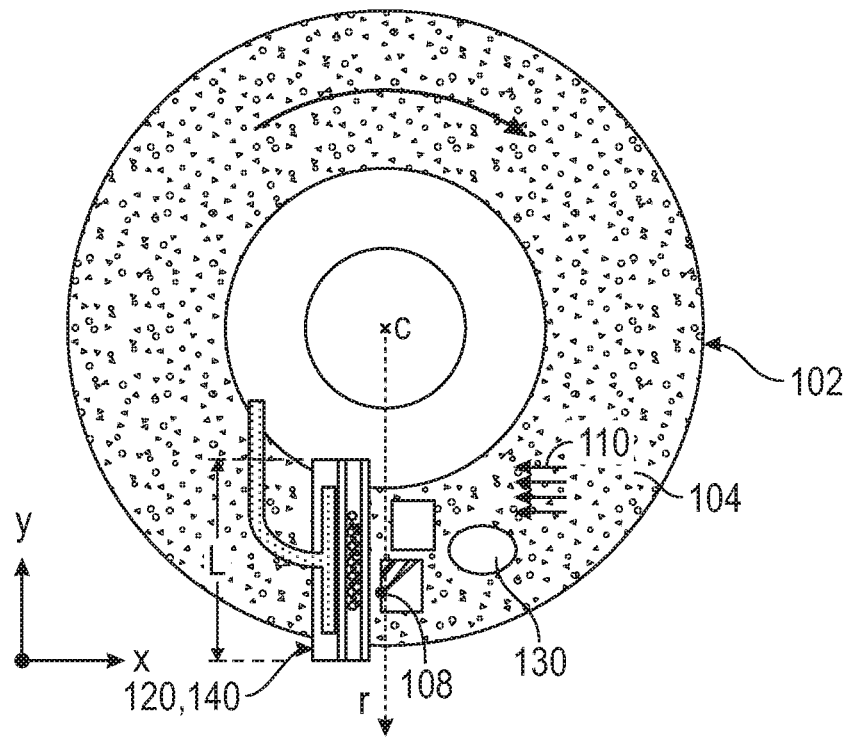
FIG. 8 illustrates positioning of a recoater-collection device relative to a component and the heat source in a continuous metal powder bed fusion system according to an exemplary embodiment.

FIG. 8 illustrates yet a further aspect of a combined recoater-collection device 120, 140 for use with a continuously moving powder bed 102. In this aspect, the powder bed 102 defines a radial line r and is rotated around a center point C. The recoater-collection device 120, 140 remains stationary and, in some aspects, parallel to the radial line r of the powder bed 102. In the illustrated aspect, several components 130 can be formed around the powder bed 102, layer by layer, in the metal powder 104. As illustrated, the components 130 need not be the same, but a variety of components 130 may be formed at the same time. Further, in this aspect, gas 110 is flowed over the powder bed 102 and towards and perpendicular to the length L of the recoater-collection device 120, 140. The heat source 108 is maintained within a given range of distances d from the recoater-collection device 120, 140. The recoater-collection device 120, 140 deposits additional metal powder 104 in a new layer as the powder bed 102 passes under the recoater-collection device 120, 140.

Figure 9A:
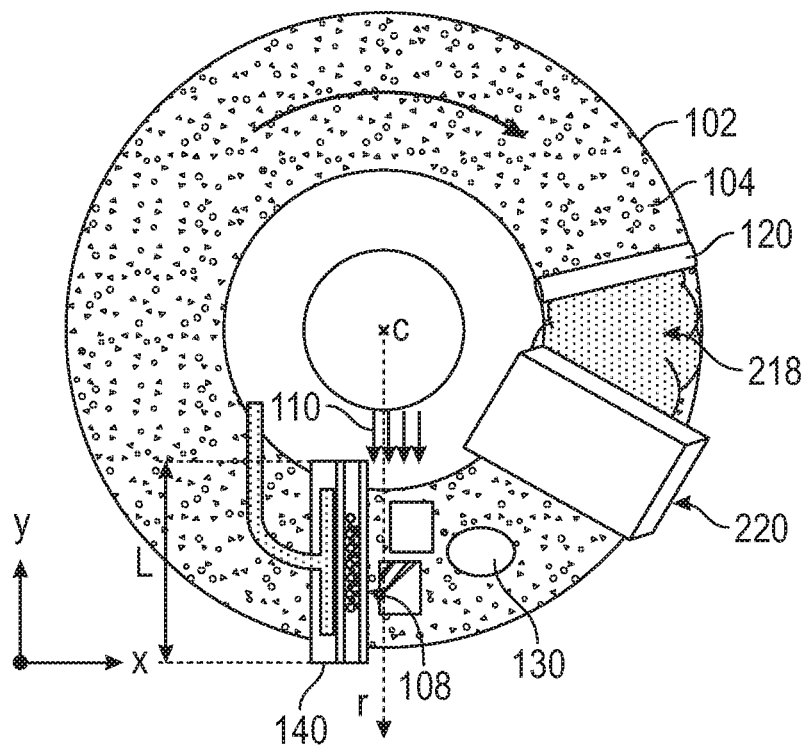
FIG. 9A illustrates a continuous metal powder bed fusion system including a collection system according to an exemplary embodiment.
Figure 9B:
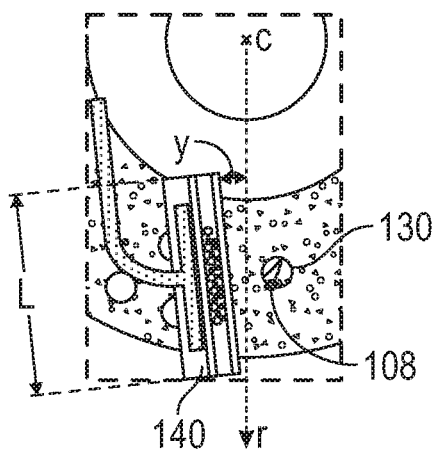
FIG. 9B illustrates rotation of the collection device in a continuous metal powder bed fusion system according to an exemplary embodiment.
Figure 9C:
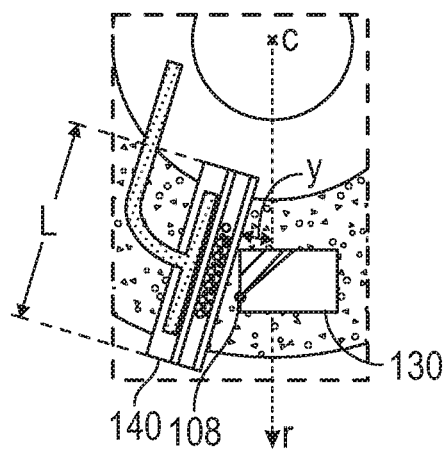
FIG. 9C illustrates rotation of the collection device in a continuous metal powder bed fusion system according to an exemplary embodiment.

FIG. 9A through 9C illustrate yet another aspect of a collection device 140 for use with a continuously moving powder bed 102. Again, the powder bed 102 defines a radial line r and is rotated around a center point C. The collection device 140, in this aspect, rotates at an angle Y relative to the radial line r of the powder bed 102 to accommodate positioning of the components 130 being formed and the location of the heat source 108. Angle Y, in aspects, is in the range of +/−0 degrees to +/−45 degrees, including all values and ranges therein. Similar to FIG. 8, several components 130 can be formed around the powder bed 102, layer by layer, in the metal powder 104. The components 130 need not be the same, but a variety of components 130 may be formed at the same time. Further, in this aspect, gas 110 is flowed over the powder bed 102 at an angle parallel to the length L of the collection device 140. It should be appreciated, however, that other angles of gas flow may be used. As illustrated in FIG. 4, the heat source 108 is maintained within a given range of distances d from the collection device 140, assisted by the rotation of the collection device 140, in some aspects. Further, in this aspect, the recoater 120 is separate and upstream from the collection device 140. The recoater 120 deposits the metal powder 104 in a paste 218 that includes a binder. In aspects, heater 220 is used to remove the binder, leaving the metal powder 104.

FIGS. 10A, 10B and 10C and FIG. 11 schematically illustrate a process of removing contaminants 111 from the powder bed 102. In aspects, the process is part of a larger process 300 of feeding metal powder 104 into the powder bed 102, collecting contaminants 111, and forming a component 130. In aspects, the process 300 begins at block 302 with filling a recoater 120 with metal powder 104. In the present illustrations, the recoater 120 and collection device 140 are integrated into a single recoater-collection device 120, 140; however, it should be appreciated that two separate devices may be used. The metal powder 104 is received from a feed tank 118 and into the feed pathway 188. Once the feed pathway 188 is full, the valve 190 in the feed tank 118 is closed.

At block 304, the recoater-collection device 120, 140 moves away from the feed tank 118 in direction of arrow A and metal powder 104 is coated onto the surface of the powder bed 102 and over any components 130 that may be present on the powder bed 102, forming a layer of unfused metal powder 104. In alternative aspects, the powder bed 102 may be moved relative to the recoater-collection device 120, 140 as previously described.

Figure 10A:
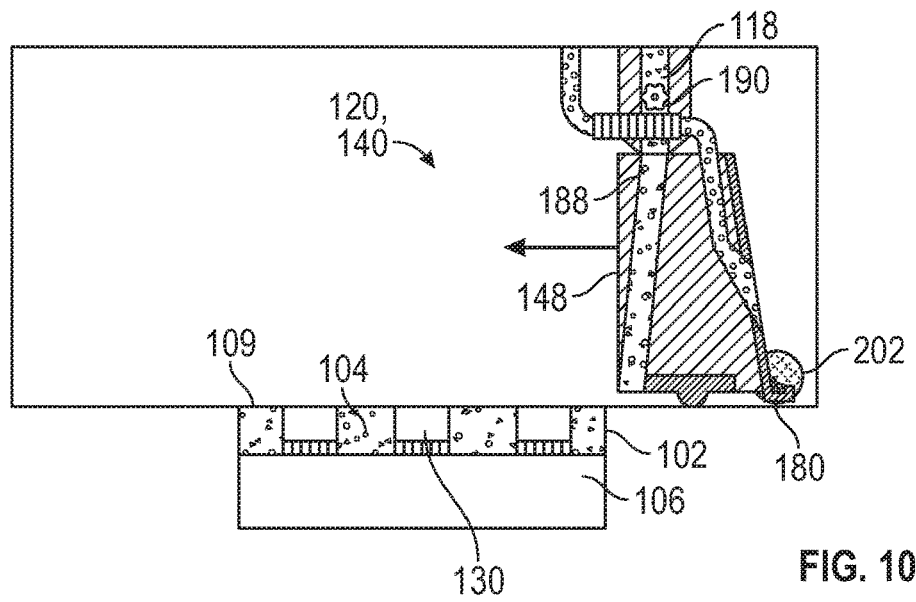
FIG. 10A illustrates a recoater-collection device receiving metal powder in a metal powder bed fusion system according to an exemplary embodiment.
Figure 10B:
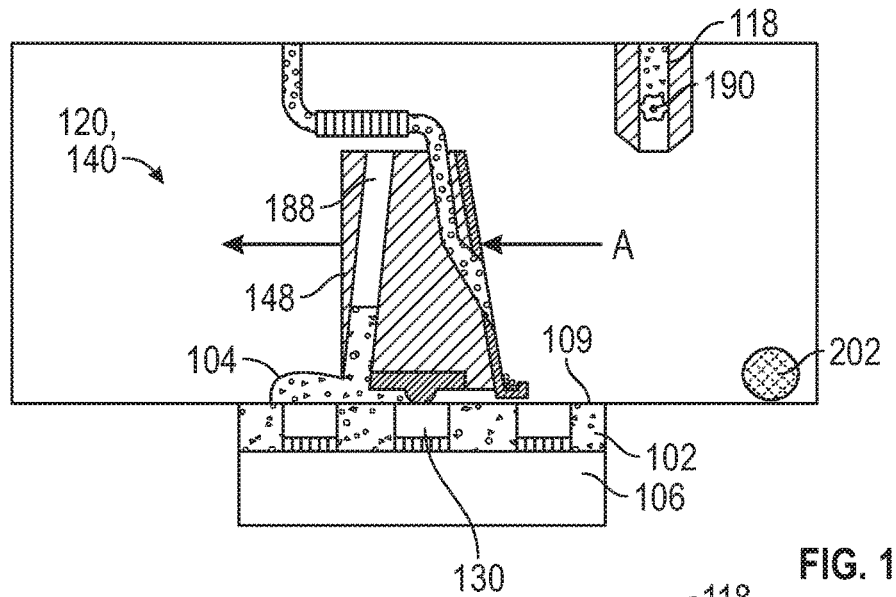
FIG. 10B illustrates the metal powder bed fusion system of FIG. 10A, wherein the recoater-collection device is depositing a layer of metal powder onto the powder bed surface according to an exemplary embodiment.
Figure 10C:
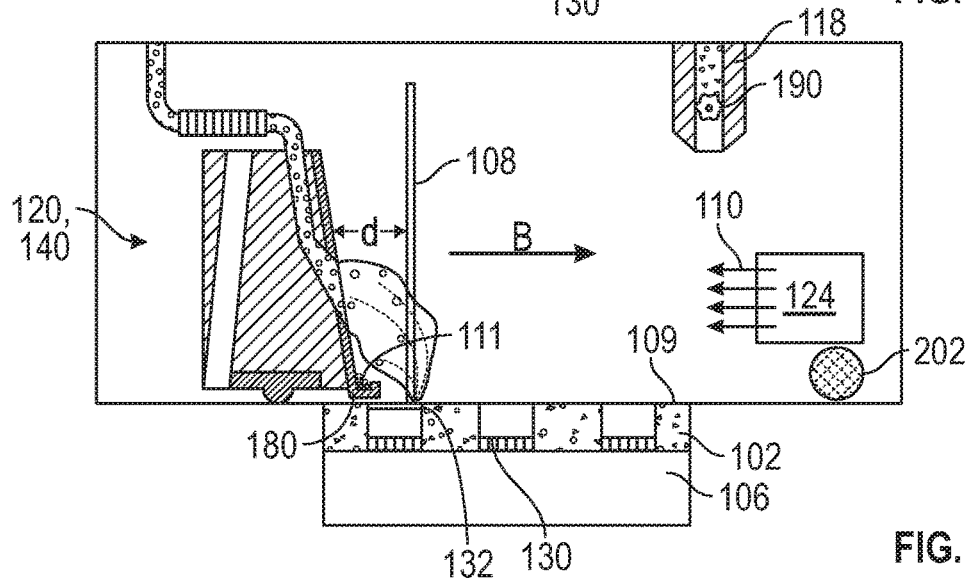
FIG. 10C illustrates the metal powder bed fusion system of FIG. 10A, wherein the recoater-collection device is collecting contaminant and metal powder is being fused according to an exemplary embodiment.
Figure 11:
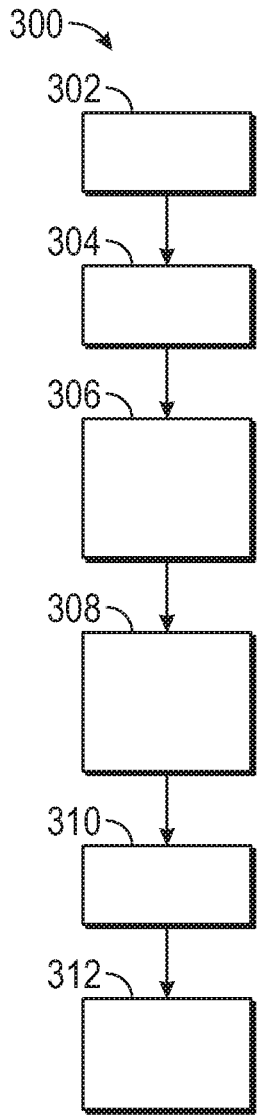
FIG. 11 illustrates a method of forming a component with a metal powder bed fusion system, including the removal of contaminant, according to an exemplary embodiment.

At block 306 the collection system 200 is activated, wherein a gas 110 is introduced and flowed across the surface 109 of the powder bed 102 and the vacuum source 156 (see FIG. 2) is activated applying a vacuum to the vacuum pathway 146. As illustrated in FIG. 10C, the gas is flowed in the direction of movement of the recoater-collection device 120, 140 across the surface 109 of the powder bed 102. It should be appreciated, however, that the gas 110 may be flowed at an angle to, including perpendicular to (as seen in FIG. 4) the direction of recoater-collection device 120, 140 movement. At block 308 the heat source 108, a laser in the illustrated aspect, is activated and at block 310 the metal powder 104 fuses, such as seen in FIG. 1, forming a layer 132 (illustrated in FIG. 3) of the component 130. During fusion of the metal powder at block 310 the recoater-collection device 120, 140 moves relative to the heat source 108 maintaining a distance less than a maximum distance d from the heat source 108 to capture the contaminants 111, and in aspects from the scanning path of the heat source 108 on the surface 109 of the metal powder 104 in the powder bed 102. In addition, the gas flow rate and vacuum pressure may be adjusted depending on, for example, the distance d between the heat source 108 and the recoater-collection device 120, 140. The recoater-collection device 120, 140 moves in direction of arrow B back towards the feed tank 118. In the illustrated aspect, the recoater-collection device 120, 140 moves towards the feed tank 118 as the heat source 108 is forming the component 130. However, in other aspects, described further herein, the recoater-collection device 120, 140 remains stationary and the powder bed 102 is moved relative to the recoater-collection device 120, 140. Optionally, at block 312 the contaminants 111 retained in the particle trap 180 are removed through vacuum port 202, which is activated and the particle trap 180 is cleared. It should also be appreciated that the gas 110 and vacuum source 156 may be activated before or as the heat source 108 is activated and terminated when or after the heat source 108 is terminated. Accordingly, blocks 306 and 308 may overlap. This process is repeated for each layer 132 of the component 130 until the component 130 is complete. It is again noted that multiple components 130 may be formed at the same time. For example, FIGS. 10A through 10C illustrate the formation of three components at once. However, a single component 130 may be formed or numerous components 130 can be formed together, depending on the size of the component 130 and the size of the powder bed 102.

In aspects, as illustrated in FIG. 10C, as the distance d between the collection device 140 or recoater-collection device 120, 140 changes, the vacuum pressure is adjusted between the vacuum source 156 and the passageway opening 150, wherein an increase in the distance d may be met with an increase in the vacuum pressure and a decrease in the distance d may be met with a decrease in vacuum pressure. Too much vacuum pressure disturbs the metal powder 104 in the powder bed 102 and too little will not pick up the contaminants 111.

Figure 12A:
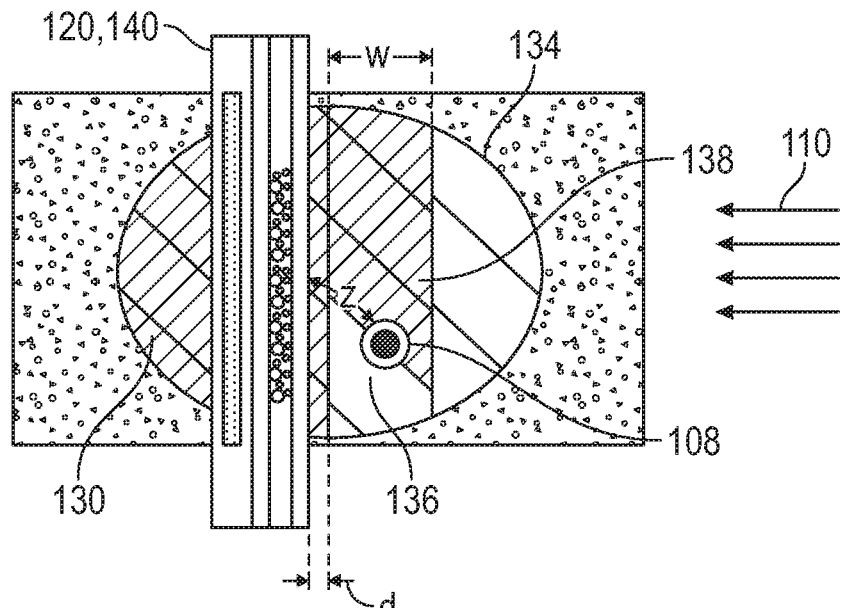
FIG. 12A illustrates a component divided into segments according to an exemplary embodiment.

Further, to maintain a distance of less than a maximum distance d between the collection device 140, or recoater-collection device 120, 140, the processor 128 divides the infill 138 of each layer 132 of the component into discrete segments 136 of a given width w while creating the executable instructions for fusing each layer 132, as illustrated in FIG. 12A. In aspects, to assist in maintaining component integrity, the executable code is programed to first fuse the borders 134 of a given layer 132 with the heat source and then fusing the infill of each layer 132. Each segment 136 is scanned by the heat source 108 consecutively beginning with the segment 136 closest to the collection device 140 and then moving to an adjoining segment. The executable code is programmed and each layer 132 is scanned such that as the heat source 108 is scanning a segment 136 the recoater-collection device 120, 140 is positioned within the maximum distance d from the heat source 108. In aspects, the maximum distance d between the recoater-collection device 120, 140 is in the range of 1 mm to 20 mm, including all values and ranges therein.

Figure 12B:
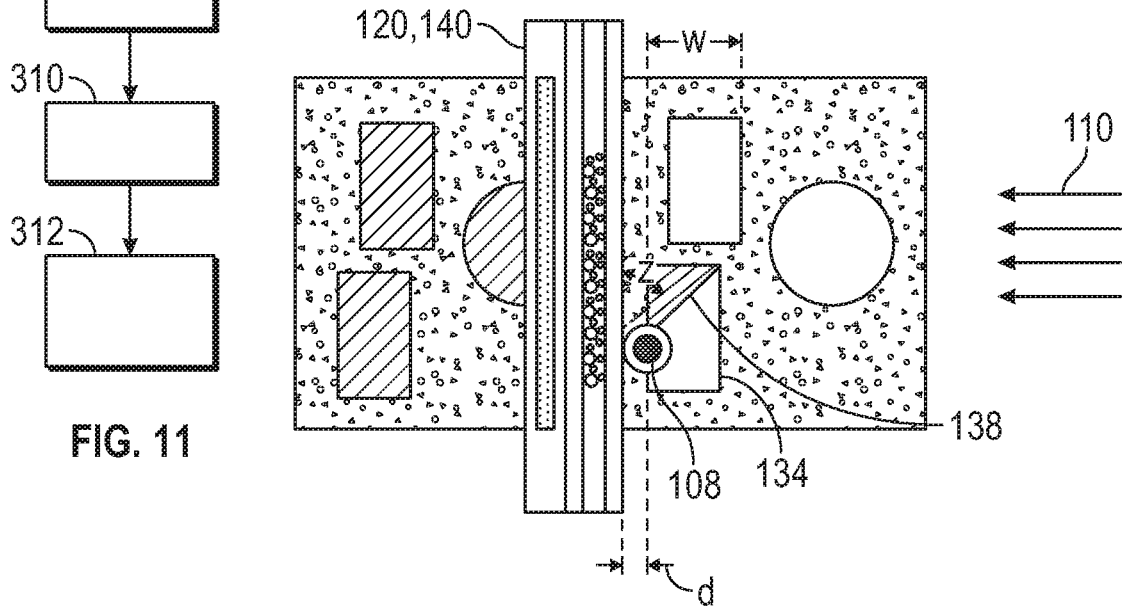
FIG. 12B illustrates a component of a given width according to an exemplary embodiment.

Further, in aspects, the scanning patterns of the heat source 108 are angled at angle Z relative to the leading edge of the recoater-collection device 120, 140 to print the infill 138. Infill is understood herein as forming the interior volume or supporting structure of the component 130. In aspects, angle Z changes with each layer 132, such as +/−0 degrees to +/−60 degrees relative to the recoater collection device 120, 140. Overlap in scanning the heat source 108 between the segments 136 is avoided. FIG. 12B illustrates a component 130 having a width w that is the entire width of a segment 136, in the range of 1 mm to 20 mm, including all values and ranges therein. In such a situation, the entire layer 132 of the component 130 is fused before the collection device 140 is moved.

The benefit of the presently claimed system and process is that local collection of spatter reduces the spread of spatter onto the powder bed and lens preventing the spread of containments through the powder bed, on the powder bed chamber, and on the lens. A further advantage is that the collection device improves the reusability of unfused powder, reduces porosity, and improves powder recyclability. Yet a further advantage is that the collection device also allows for use in relatively larger build areas.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A powder bed fusion system, comprising:
a powder bed including a build surface; and
a vacuum system including a collection device positioned over the build surface including
a body,
a pathway defined in the body, wherein the pathway ends in a passageway opening,
a particle trap connected to the body; and
a particle retainer connected to the body and extending out from the body near the passageway opening and particle trap,
wherein the particle retainer and particle trap extend the length of the body.

2. The powder bed fusion system of claim 1, wherein the particle retainer includes a magnetic roller.

3. The powder bed fusion system of claim 2, wherein the magnetic roller is driven by a motor.

4. The powder bed fusion system of claim 1, wherein the vacuum system includes a retractable tube connected to the body.

5. The powder bed fusion system of claim 1, further comprising a centrifugal pump connected to the body in the passageway opening.

6. The powder bed fusion system of claim 1, further comprising a recoater device including a feed pathway defined by the body.

7. The powder bed fusion system of claim 1, wherein the body further includes a bottom and the powder bed fusion system further comprises a leveling device located at or near the bottom of the body and the leveling device is in the form of a protrusion extending the length of the collection device.

8. The powder bed fusion system of claim 7, wherein the leveling device includes a roller.

9. A powder bed fusion system, comprising:
a powder bed including a build surface;
a feed tank;
a recoater connectable to the feed tank movable over build surface;
a heat source located over the powder bed;
a vacuum system including a collection device positioned over the build surface including
a body,
a pathway defined in the body, wherein the pathway ends in a passageway opening,
a particle trap connected to the body; and
a particle retainer connected to the body an extending out from the body near the passageway opening and particle trap, wherein the particle retainer and particle trap extend the length of the body; and
a gas supply system connected to the powder bed.

10. The powder bed fusion system of claim 9, wherein the recoater and the collection device are integrated.

11. The powder bed fusion system of claim 9, wherein the collection device is movable relative to the powder bed.

12. The powder bed fusion system of claim 9, wherein the powder bed is movable relative to the collection device.

13. The powder bed fusion system of claim 9, wherein the powder bed includes a vacuum port and the collection device is movable to align the particle retainer with the vacuum port.

14. The powder bed fusion system of claim 9, further comprising a leveling device in the form of a protrusion extending the length of the collection device.

* * * * *